US012158009B2

(12) United States Patent
Palladino

(10) Patent No.: US 12,158,009 B2
(45) Date of Patent: *Dec. 3, 2024

(54) CLADDING PANEL

(71) Applicant: Luigi Palladino, Delaware (CA)

(72) Inventor: Luigi Palladino, Delaware (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,769

(22) Filed: Apr. 25, 2023

(65) Prior Publication Data

US 2023/0258001 A1    Aug. 17, 2023

Related U.S. Application Data

(63) Continuation of application No. 17/335,480, filed on Jun. 1, 2021, now Pat. No. 11,668,098, which is a
(Continued)

(51) Int. Cl.
| | |
|---|---|
| *E04B 1/70* | (2006.01) |
| *B32B 3/06* | (2006.01) |
| *B32B 5/16* | (2006.01) |
| *B32B 7/12* | (2006.01) |
| *B32B 27/14* | (2006.01) |
| *B32B 27/30* | (2006.01) |
| *B32B 37/12* | (2006.01) |

(Continued)

(52) U.S. Cl.
CPC ............ *E04F 13/0876* (2013.01); *B32B 3/06* (2013.01); *B32B 5/16* (2013.01); *B32B 7/12* (2013.01); *B32B 27/14* (2013.01); *B32B 27/302* (2013.01); *B32B 37/12* (2013.01); *B32B 37/24* (2013.01); *E04F 13/0878* (2013.01); *E04F 13/0889* (2013.01); *E04F 13/147* (2013.01); *B32B 2264/10* (2013.01); *B32B 2307/304* (2013.01); *B32B 2307/4026* (2013.01); *B32B 2318/04* (2013.01); *B32B 2451/00* (2013.01); *B32B 2607/00* (2013.01)

(58) Field of Classification Search
CPC ........... E04F 13/0876; B32B 3/06; B32B 5/16
See application file for complete search history.

(56) References Cited

U.S. PATENT DOCUMENTS

| | | | | |
|---|---|---|---|---|
| 2,338,246 | A | * | 1/1944 | Hoge .................... E04C 2/06 52/592.1 |
| 2,777,318 | A | * | 1/1957 | Kinsman ................ E04C 2/384 52/447 |

(Continued)

*Primary Examiner* — Basil S Katcheves
(74) *Attorney, Agent, or Firm* — Eduardo Krupnik

(57) ABSTRACT

A panel for covering a substrate including: a body having a first connecting profile and a second connecting profile, and a mesh, the first connecting profile and the second connecting profile being complementarily shaped in such a way that adjacent panels are coupled to one another via the first connecting profile and the second connecting profile, each of the first connecting profile and the second connecting profile comprising a pocket and a flange, the pocket of the first connecting profile being shaped for receiving the flange of the second connecting profile and the pocket of the second connecting profile being shaped for receiving the flange of the first connecting profile, wherein the mesh overhangs both the pocket of the first connecting profile and the pocket of the second connecting profile, said mesh overhangs configured for attachment of the panel to the substrate.

17 Claims, 11 Drawing Sheets

Related U.S. Application Data continuation of application No. 16/473,883, filed as application No. PCT/CA2018/000015 on Jan. 25, 2018, now abandoned.

(51) Int. Cl.
  *B32B 37/24* (2006.01)
  *E04F 13/08* (2006.01)
  *E04F 13/14* (2006.01)

(56) References Cited

U.S. PATENT DOCUMENTS

| | | | | |
|---|---|---|---|---|
| 4,257,204 A * | 3/1981 | Rieger | ............ | E04B 2/92 |
| | | | | 52/542 |
| 4,510,726 A * | 4/1985 | MacDonald, Jr. | ........ | E04B 2/32 |
| | | | | 52/410 |
| 5,064,313 A * | 11/1991 | Risi | ............ | E02D 29/0241 |
| | | | | 405/262 |
| 5,681,639 A * | 10/1997 | Minagawa | ............ | E04B 1/762 |
| | | | | 428/156 |
| 5,987,835 A * | 11/1999 | Santarossa | ............ | E04B 1/762 |
| | | | | 52/592.1 |
| 6,119,422 A * | 9/2000 | Clear | ............ | E04C 2/26 |
| | | | | 52/309.8 |
| 6,860,082 B1 * | 3/2005 | Yamamoto | ............ | E04B 1/803 |
| | | | | 52/406.1 |
| 7,036,284 B1 * | 5/2006 | Larson | ............ | E04F 13/06 |
| | | | | 52/506.1 |
| 9,562,359 B1 * | 2/2017 | Grisolia | ............ | B32B 3/266 |
| 11,668,098 B2 * | 6/2023 | Palladino | ............ | E04F 13/147 |
| | | | | 52/302.1 |
| 2005/0210806 A1 * | 9/2005 | Guerra | ............ | E04D 1/265 |
| | | | | 52/518 |
| 2006/0053740 A1 * | 3/2006 | Wilson | ............ | E04F 13/141 |
| | | | | 52/745.09 |
| 2007/0175154 A1 * | 8/2007 | Wilson | ............ | E04F 13/007 |
| | | | | 52/521 |
| 2007/0261353 A1 * | 11/2007 | Cullen | ............ | E04F 13/0878 |
| | | | | 52/590.2 |
| 2008/0115442 A1 * | 5/2008 | Cheng | ............ | B32B 13/02 |
| | | | | 52/745.13 |
| 2010/0257800 A1 * | 10/2010 | Cassells | ............ | E04C 2/288 |
| | | | | 52/794.1 |
| 2011/0173911 A1 * | 7/2011 | Propst | ............ | B32B 13/045 |
| | | | | 427/403 |
| 2012/0018103 A1 * | 1/2012 | Ashelin | ............ | A47H 21/00 |
| | | | | 160/123 |
| 2012/0247040 A1 * | 10/2012 | Buoni | ............ | E04F 13/04 |
| | | | | 52/302.1 |
| 2013/0104480 A1 * | 5/2013 | Smith | ............ | B29C 39/10 |
| | | | | 52/309.7 |
| 2014/0169869 A1 * | 6/2014 | Brumfield | ............ | B32B 5/18 |
| | | | | 403/345 |
| 2015/0047281 A1 * | 2/2015 | Cole | ............ | E04B 1/762 |
| | | | | 52/302.1 |
| 2016/0024788 A1 * | 1/2016 | Grisolia | ............ | B32B 5/12 |
| | | | | 52/302.1 |
| 2018/0179754 A1 * | 6/2018 | Karnicki | ............ | B27N 7/005 |
| 2019/0309525 A1 * | 10/2019 | Santarossa | ............ | E04F 19/064 |

* cited by examiner

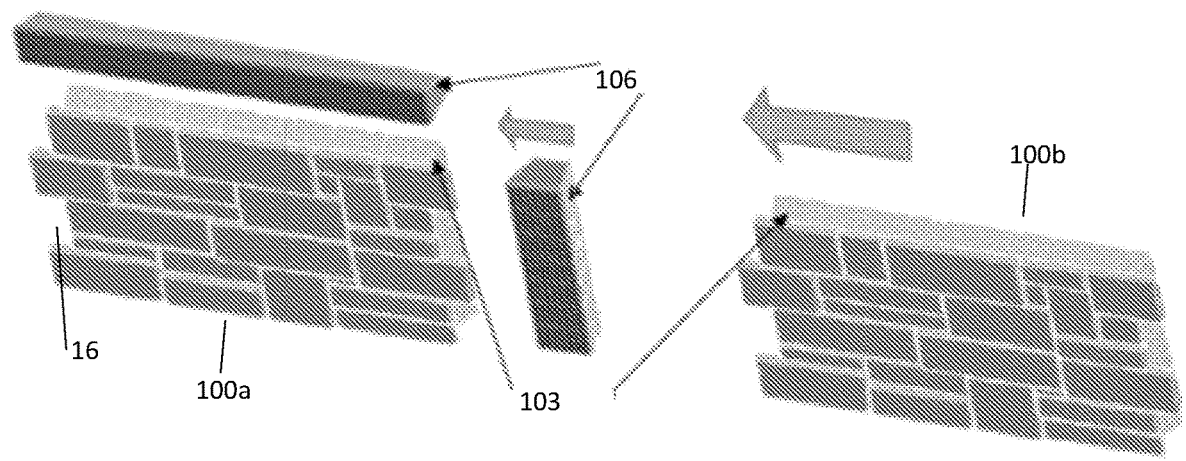
Fig. 7A
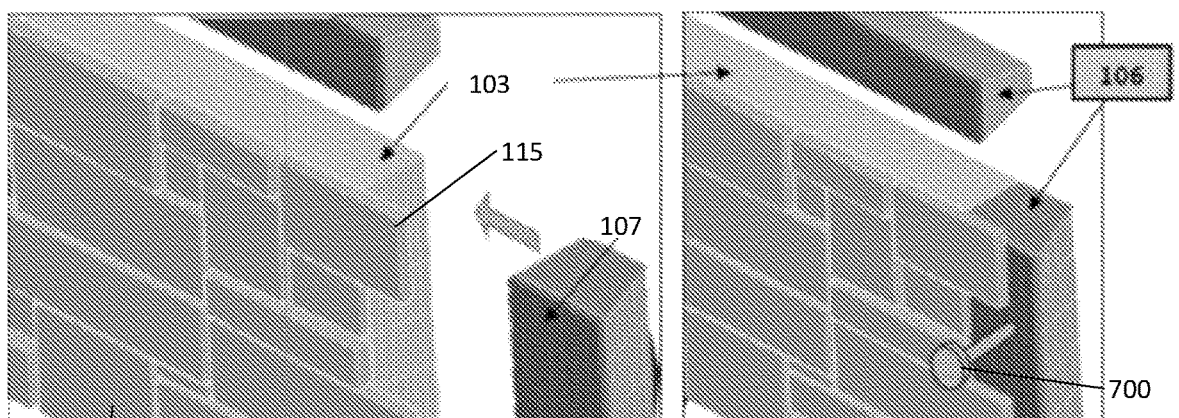
Fig. 7B
Fig. 7C

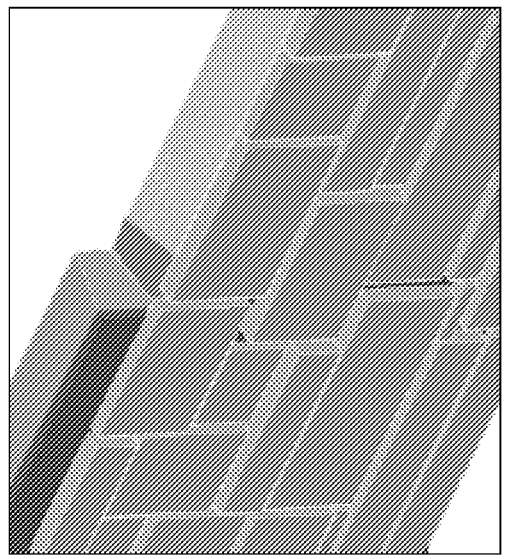
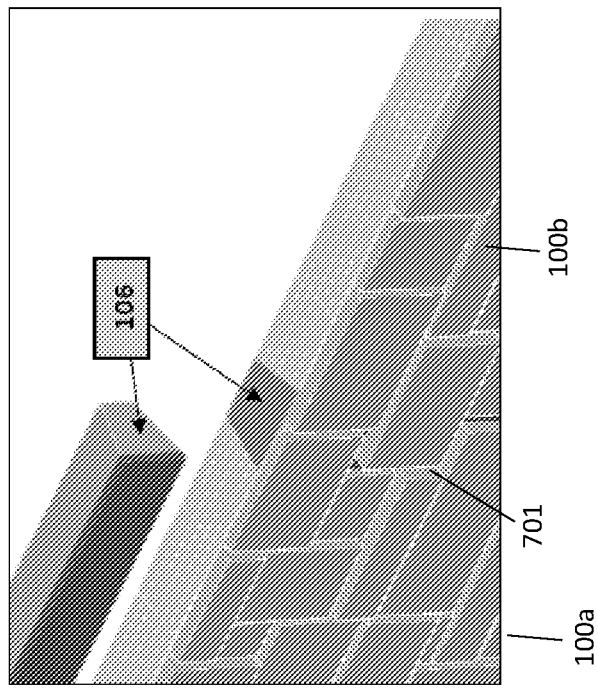
Fig. 7D
Fig. 7E

CLADDING PANEL

CROSS REFERENCE TO RELATED APPLICATIONS

This application is a continuation of U.S. patent application Ser. No. 17/335,480, which in turn is a continuation of U.S. patent application Ser. No. 16/473,883 filed Jun. 26, 2019, which in turn is a national stage application under 35 U.S.C. 371 of International Application No. PCT/CA2018/000015, filed Jan. 25, 2018, which in turn claims the benefit under 35 U.S.C. 119(e) of U.S. Provisional Application No. 62/450,426, filed Jan. 25, 2017, the contents of each of which are hereby incorporated by reference into the present disclosure.

FIELD OF THE INVENTION

The field of this invention relates to cladding material constructions and, more particular, to cladding panels and modules for decoration and/or insulation of structures such as buildings and houses.

BACKGROUND OF THE INVENTION

The most common materials, for insulate the walls and the roofs of a house, are rigid foam (polystyrene or polyurethane), or wool (made form fiberglass or rock). Those materials are typically light, with a high insulation power (their R-value per inch is between 3.2 and 7.2). However, because of their softness and permeability, these materials need protection: this is why in a building they are found inside the walls or in the attic. The insulation process is relatively easy to execute during the construction of the building; unfortunately, the insulation process may not be as easy for an already constructed house with a solid bricks or stones finishing, which needs to improve its insulation.

A solution, in this case, is to insulate the exterior surface of the wall with rigid foam and then protecting it with vinyl siding or stucco (EIFS system) giving up at the aesthetic finishing of the existing façade. Another solution to protect the insulation and at the same time have a similar finishing is building an additional wall in order to support the weight of the new installation (made of bricks or stones).

In the last decades, stone veneer became another alternative protection and finishing of the insulation made of rigid foam installed on exterior wall of the house. Made from concrete and colored with iron oxide, this product is less heavy and easier to work with than real stone or brick; it can be installed, after a proper preparation, directly on the rigid insulation and the appeal, look like real.

Another solution is using polyurethane panels (faux stone) with the appeal of bricks or stones assembled and grouted. This product, differently from the previously mentioned stone veneer, has insulation power, albeit low due its high density in order to increase his mechanical resistance.

However, all the previously mentioned products and materials have strong limitations:

Built on site EIFS System:
  It can crack: 1. when is made manually on site, the thickness of the coating is not even causing different shrinks; 2. when made under extreme whether condition; 3. The system itself can hold just some but not all of the natural movement of the building being insulated; 4. Because the exterior surface is permeable, the moister, trapped inside the coating, will eventually turn in ice in the winter, and deteriorate the insulation property.
  The color fades because of the UV effect
  It can't hold any weight except with some precautions
  Patches or additions will be always noticeable
Pre-fabricated system EIFS:
  The exterior finishing, made in panels, shows seam where the panels join
  Variation of finishing just in the color
Stones end Brick:
  Because of their weight, transportation and handling require excessive time and is expensive
  Brick absorbs moister causing crumbling over the years
  Have to be installed and cut one by one
  Experts to layer breaks are not easy to find
  Stone quarries are not everywhere
  not earthquake-proof
Stone veneer:
  They can be installed directly on the rigid insulation, but because of the weight of the stone veneer, the insulation board surface needs to be reinforced adding to the cost and time of labor
  The color is superficial. If cut or accidentally chipped will show the material of which are made: concrete
  Because of its porosity, the concrete absorbs and transfers moisture to the insulation
  Not earthquake-proof
Polyurethane panels (faux stone)
  The color is superficial. If cut or accidentally chipped will show the material of which are made: polyurethane
  Easy to scratch
  Their look is poor (i.e. poor aesthetics)
  Because are made in panels they need to be cut in order to get the desired dimension in proximity of the corners, leaving a visible straight vertical seam and a non-continuity in the finishing.

Perhaps with the exception of the polyurethane panel, the other materials mentioned above require skilled labor.

Technical Problem

The demand of performance products capable to overcome the above problems and limitations has prompted the industry of insulation system and of artificial stones to develop system of insulation with new concepts. The obstacle to overcome is represented by the need to give to a "soft" material, such as polystyrene or polyurethane, hardness, beauty and durability like the finest materials of marble or stone. U.S. Pat. No. 8,806,838 discloses a stone plate attached to a front surface of the insulating board; and a reinforcing board attached to a rear surface of the insulating board where brackets will connect, said stone plate, said insulating board and said reinforcing board, to the wall. However, the above technology has several limitations. A limit in the finishing, because of the absorption characteristic of the cement of which said stone is made. A limit in the high cost of said reinforcing board attached to a rear surface of the insulating board, and a limit in said brackets made in metal, that, connecting the three above said layers, will become a thermal bridge from the outside to the wall. On the other hand, for the industry of said artificial stones, the obstacle is to develop a product that may represent appearance close to the natural beauty of the marble, stones or bricks, and at the same time, light enough to install it on an insulation board. For the obstacle of the appearance above mentioned, German Patent No 5364 672 discloses a method to produce artificial stones using a mix of waste glass and resin. This procedure, that includes the exclusive use of waste or new powder glass, will leave on the surface an unnatural color because the glass is artificially colored. Japanese Patent No 6127458 provides also an artificial stone molded by injecting a composition of resin and mineral chips into a mold and after cured and demolded, polished, in order to show the minerals color. The limit on the result, appear on the polishing phase, that will expose, unprotected, the surface of the mineral, which can be affected by UV and the weather. Combining the weightlessness and the insulation characteristics of the foam material with those of decoration and stability of brick or stone is the biggest challenge.

Technical Solution

Marble is a metamorphic rock composed of recrystallized carbonate minerals, most commonly calcite or dolomite. The recrystallized carbonate minerals are those that give the translucency feature to this beautiful stone called from the Ancient Greek (mármaros), "crystalline rock, shining stone". The method of transfer durable features, such as hardness, shape, texture, translucency of the natural color of the stones, marble, bricks (terra cotta) on a soft insulating surface, to make it as a unique product, its use and application, is the object of this patent. The present invention includes the creation of a system of insulation modules having the appearance of dry stack or grout stone siding or grout brick or hollow tiles or roof tiles or any other shapes. The insulation system of the present invention includes a number of modules with substantial coordinated sizing under a criterion disclosed in this document.

Advantageous Effects

The present invention relates to panels with an external surface that simulates brick, stone, tile or marble and includes a method that may provide a kit of panels that, when installed on a surface including wall, floor or roof, without a need to cut or modify, said modules will fit any sizes of said surfaces, without showing where said modules are joining. Additionally includes methods to produce artificial cladding that includes grout between components, including stones, bricks or tiles, assembled as one body in a module that may be part of said kit. Furthermore, include method to produce said grout in independent color from the color of said components. Moreover includes methods to produce on said module, a controlled thickness of a layer of insulation in order to determinate desired R-value.

SUMMARY OF THE INVENTION

In one embodiment, the present invention relates to a cladding panel comprising a top multi-film layer and a base layer configured for connection to a substrate, the top multi-film layer including at least an external substantially transparent film and a granular film adjacent to the external substantially transparent film.

In one embodiment of the cladding panel of the present invention, the top multi-film layer further includes a support film of background color adjacent to the granular film.

In another embodiment of the cladding panel of the present invention, the cladding panel further comprises a middle layer connecting the top multi-film layer to the base layer.

In another embodiment of the cladding panel of the present invention, the granular film is a composition comprising one or more additives of an inorganic filler, a cross-linking agent, a cross-linking accelerator and one or more color pigments.

In another embodiment of the cladding panel of the present invention, the granular film includes dust of a natural rock, including marble, and granite.

In another embodiment of the cladding panel of the present invention, the base layer comprises an insulating material.

In another embodiment of the cladding panel of the present invention, the cladding panel includes sides having an attachment mechanism that frictionally interlocks with the attachment mechanism of another complementary cladding panel.

In another embodiment of the cladding panel of the present invention, the base layer has sides with dovetail shapes for connection to another cladding panel.

In another embodiment of the cladding panel of the present invention, the interior layer includes ventilation channels.

In another embodiment of the cladding panel of the present invention, the top multi-film layer is configured to simulate stones, tiles or bricks separated by grout.

In another embodiment, the present invention provides for a method of manufacturing a cladding panel for cladding a surface of a structure. The method, in one embodiment, comprises: (a) layering a substantially transparent polymer so as to form a substantially transparent film; and (b) disposing onto the substantially transparent film a layer of natural granules thereby forming a granular film, wherein the substantially transparent layer and the layer of natural granules form a multi-film external layer of the cladding panel.

In one embodiment of the method of manufacturing a cladding panel of the present invention, the method further comprises: (c) disposing onto the granular film, a film of mechanical support having one or more binders, fillers and dyes, wherein the substantially transparent layer, the layer of natural granules and the mechanical support layer form the multi-film top layer of the cladding panel.

In another embodiment of the method of manufacturing a cladding panel of the present invention, step (b) comprises disposing the natural granules as clusters of different colors and sizes.

In another embodiment of the method of manufacturing a cladding panel of the present invention, the method comprises creating clusters of natural granules of different colors, laying the clusters on top of each other to form a mass, and cutting the mass in slices, and wherein step (b) comprises disposing the slices onto the substantially transparent layer.

In another embodiment of the method of manufacturing a cladding panel of the present invention, the method further comprises filling gaps in the granular film with a liquid mixture of substantially clear epoxy and color pigments to simulate veins.

In another embodiment of the method of manufacturing a cladding panel of the present invention, the films are layered or disposed on a base of a mold's cavity, and wherein the base of the mold's cavity includes protruding ribs having a top surface, and wherein the method further comprises disposing on the top surface of the ribs a composition that simulates grout.

In another embodiment of the method of manufacturing a cladding panel of the present invention, the method further comprises: (c) disposing a foaming binder on the film of mechanical support, and (d) disposing a base insulating layer onto the foaming binder thereby attaching the base insulating layer to the multi-film top layer.

In another embodiment the present invention provides for a kit of panels for covering a surface of a structure having a length x, wherein said kit includes a first panel having a width equal to a, a second panel having a width equal to a+1, a third panel having a width a+2 and a fourth panel having a width a+3, wherein x is greater or equal to three times a, and wherein x and a are positive integers.

BRIEF DESCRIPTION OF THE DRAWINGS

The following Figures illustrate various aspects and preferred and alternative embodiments of the invention.

FIGS. 7A-7E connection between modules of the present invention during the installation of a support using an expansion joint system in accordance to one aspect of the present invention.

DESCRIPTION OF THE INVENTION

Definitions

Figure 1A:
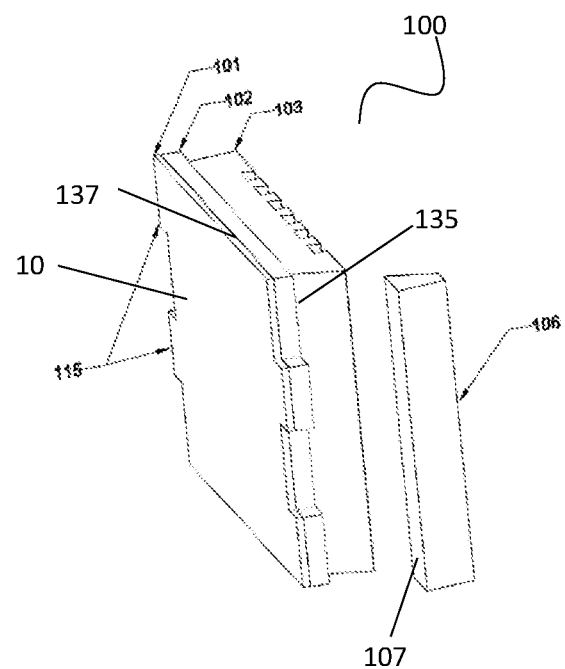
FIG. 1A is perspective side view of a panel depicting the three different layers according to one embodiment of the present invention.

Unless defined otherwise, all technical and scientific terms used herein have the same meaning as commonly understood by one of ordinary skill in the art to which this invention belongs. Also, unless indicated otherwise, except within the claims, the use of "or" includes "and" and vice versa. Non-limiting terms are not to be construed as limiting unless expressly stated or the context clearly indicates otherwise (for example "including", "having" and "comprising" typically indicate "including without limitation"). Singular forms including in the claims such as "a", "an" and "the" include the plural reference unless expressly stated otherwise. All relevant references, including patents, patent applications, government publications, government regulations, and academic literature are hereinafter detailed and incorporated by reference in their entireties. The term "about" modifying any amount refers to the variation in that amount encountered in real world conditions of producing materials such as polymers or composite materials, e.g., in the lab, pilot plant, production facility, or panels. Whether or not modified by about, the amounts include equivalents to those amounts. Any quantity stated herein and modified by "about" can also be employed in the present invention as the amount not modified by about. In order to aid in the understanding and preparation of the within invention, the following illustrative, non-limiting, examples are provided.

In this document, references are made to layers, films and coats. It is understood that each layer, film and coat has an external or first surface, and an internal or second surface. When applied to a surface or a layer or a film or a coat, the terms "external" "top," or "first" refer to the surface, layer, film or coat that would be facing or would be exposed to the environment when the panel is attached to the substrate of a structure (i.e. away from the substrate of the structure), and it includes the layer that can be viewed. The terms "internal" or "second" refer to the surface, layer, film or coat that would be facing or is adjacent to the substrate of the structure to which the module or panel of the present invention is attached to.

The Panel
Preferred Mode for Carrying Out the Invention
Overview

The panel object of the present invention simulates genuine brick, stone, marble, slabs, tiles and so forth. The panel of the present invention may vary in shape, texture, color, and weight, depending on the sought after style (tile, brick, stone, marble slab, and so forth) and the purpose (decoration of a wall, or create a countertop for a vanity) chosen. The panel for the decoration of a building wall, for example, could have the appearance of a finished assembled stonewall and generally will comprise an interlocking system for the assembly. In one embodiment, the panel may simulate repeating brick or ceramic tile patterns.

The dimensions of the panel, ranges, for example from side to side the panel may range from about 1' (1 foot or 30.48 cm) by 1' to the width of the wall, but for convenience, is preferable a dimension that is easy to be managed by one person, for example 4' (~121 cm) wide by 2' (~60.96 cm) feet high.

The thickness of the panel may depend on the shape of the decoration and the purpose of the installation that, for example, may also include the thermal insulation of the wall. In case one chooses to simulate a flag-stone and wants to reach a thermal resistance of 25R-value of the wall, the total thickness may range between 5" (~12.7 cm) and 8" (~20.32 cm).

The manufacture of the external layer of the panel will depend on the platform being simulated. For example, in the case of flag-stone, it will be achieved by a combination of two different dust marble, pink corallo and White Carrara, while gray occhialino may be used for the grout color.

The Panel

Figure 1B:
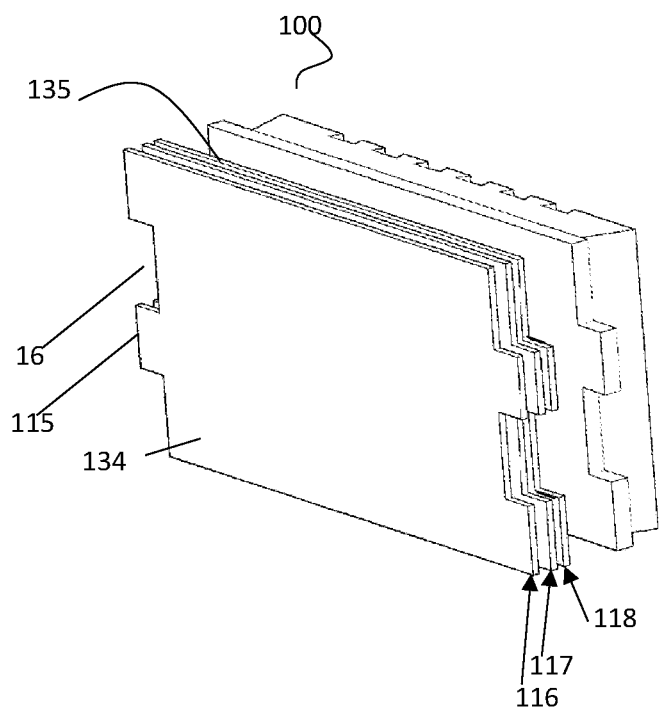
FIG. 1B is a perspective front view of a panel depicting the external multi-films according to one embodiment of the present invention.
Figure 2:
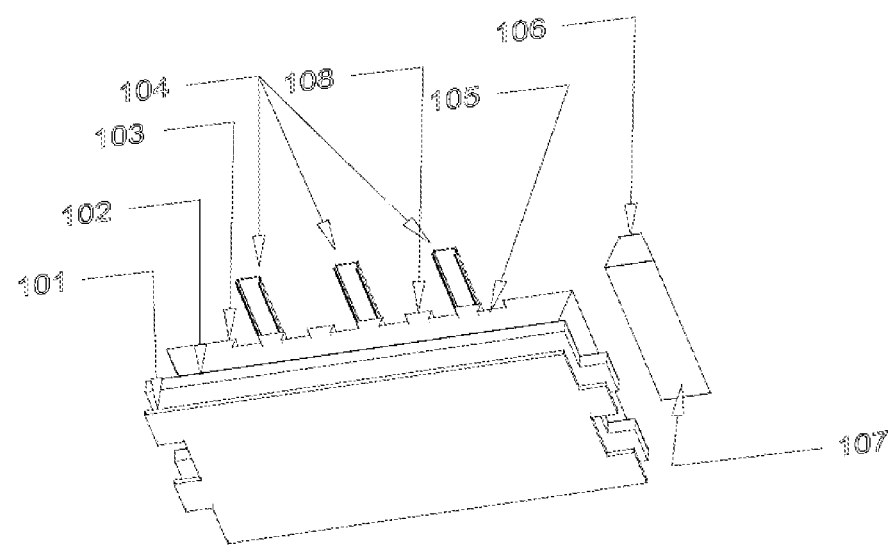
FIG. 2 is an exploded view of a panel depicting the parts of the module according the present invention.
Figure 3:
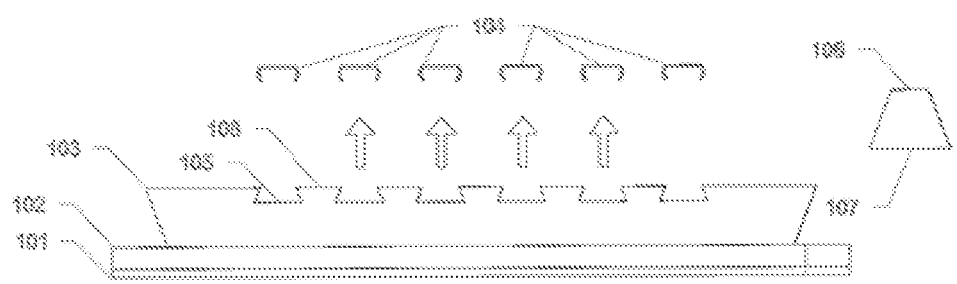
FIG. 3 is a pattern diagram depicting the connection between the parts during the installation of module on the support, according the present invention.

With reference to FIGS. 1A and 1B, a panel 100, according to one embodiment of the present invention, may include a body 10, a top layer 101 which provides a viewable surface, a base layer 103 which may provide structure and/or insulation, and a middle layer 102 which may provide the connection between the top layer 101 and the base layer 103.

The top layer 101 may include an external or first surface or top face 134, an internal or second surface or bottom face 135 and sides 137 extending from the first surface 134 to the second surface 135. In the case of a rectangular panel, the external layer would include 4 sides, in a triangular panel, 3 sides, and so forth.

The top layer 101 may be made of one film/coat or of multiple films/coats (i.e. multi-film or multi-coat). The term "multi-film" or "multi-coat" as used herein, refer to an overlapping of several or many films or coats as shown in FIG. 1B: an external substantially transparent film/coat 116, a film/coat of natural granules 117, and a support film/coat 118. Although FIG. 1B illustrates 3 films, it should be understood that less or more than 3 films are possible.

The external coat 116 of the top layer 101 may be a substantially transparent film 116. The external substantially transparent film 116 may be made of a substantially transparent polymer, such as an acrylic resin, an unsaturated polyester resin, an epoxy resin, a melamine resin, a urethane resin, as described herein below. The external film 116 forms the first surface 134 of the top layer 101.

The natural granule film 117 lies directly beneath the external film 116. The natural granule film 117 may be made of inorganic fillers. Natural granules include one or more additives of an inorganic filler, a cross-linking agent, a cross-linking accelerator and a pigment, in addition to the above described components. Specific kinds of the inorganic fillers above are not particularly limited. Examples of these inorganic fillers may include one or more of calcium carbonate, silica, metal hydroxide, minerals and alumina. Specific diameter sizes of the inorganic fillers above are not particularly limited and any particle sizes ranging from 0.05 mm to 20 mm can be used.

The support film 118 may provide mechanical support to the external film 116 and the granule film 117 as well as provide background color. The support film 118 may be made of binders and/or fillers as described herein below. The support film 118 forms the internal or second surface or bottom face 135 of the top layer 101.

The top layer 101 of the panel may simulate any genuine brick, stone, marble, granite, slab, tile desired and any desired pattern of bricks, stone, marble, granite, and tiles.

The middle layer 102 provides the connection between the top layer 101 and the base layer 103. The middle layer 102 may be made of a foaming binder such as polymer foam or cellular cement.

Figure 4:
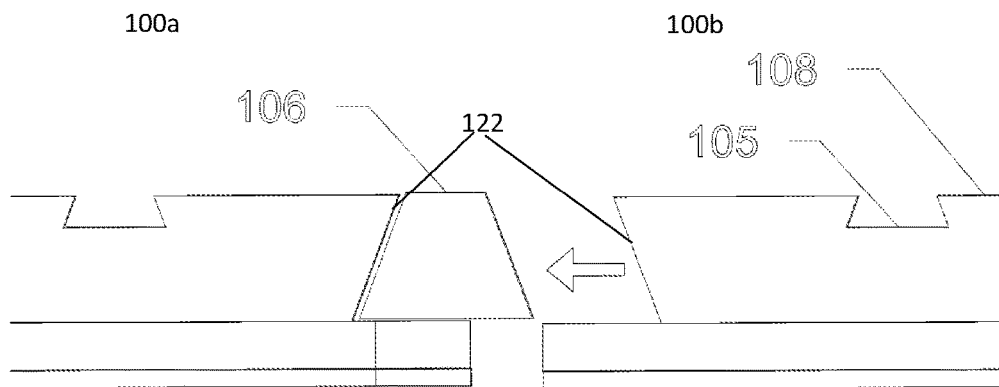
FIG. 4 is a pattern diagram depicting the connection between the panels during the installation on a support using an expansion joint system in accordance to one aspect of the present invention.
Figure 5:
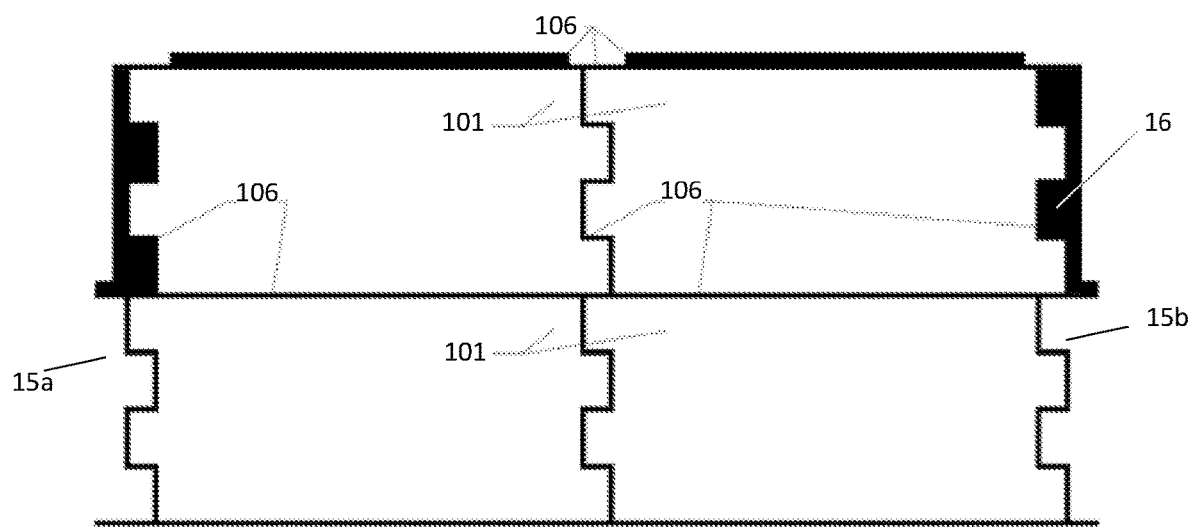
FIG. 5 is a pattern diagram depicting the connection between the modular panels during the installation on the support according the present invention.

The base layer 103 is the layer that provides the insulation and/or structure. The base layer 103 may be made of any suitable material that provides insulation and may also provide structure to the panel, such as extruded polystyrene, expanded polystyrene, polyisocyanurate, polyurethane, cementitious foam, cellular glass, vermiculite and so forth. The base layer 103 includes a first face that faces the second surface of the top layer 101, and a second face 108 that faces the substrate of the structure being covered. The second face 108 may include one or more ventilation channels 105 as illustrated in FIG. 4. The transversal cross section of the ventilation channels may take any suitable shape, such as "T" or "V" shapes.

The panels 100 may take any suitable shape, such as rectangular, circular, triangular, square, and so forth.

The panels may include an interlocking system to interlock with other panels, or they may be devoid of interlocking system.

Figure 10:
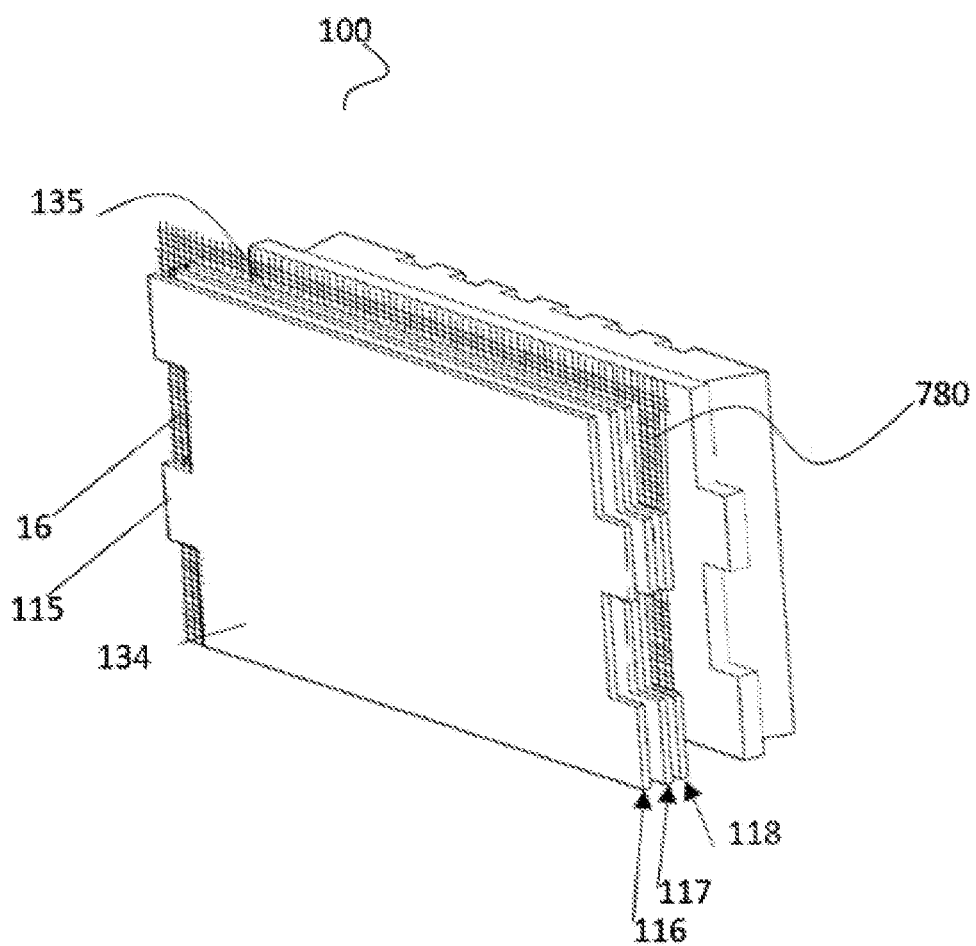
FIG. 10 is a perspective view of a panel according to another embodiment of the present invention including a mesh.

As illustrated in FIG. 10, the panel may also include a mesh 780 connected to the second surface of the support film 118, which may be made of metal or a fiber that is non-combustible. This optional mesh will reinforce the structure of the layer 101 and will function as a place for mechanical support of the panel if the insulation layer 103 is not required or to prevent the detachment of the panel from the support (wall), if, in case of fire, the layer 103 the primary place of mechanical support of the panel, will melt.

Figure 11A:
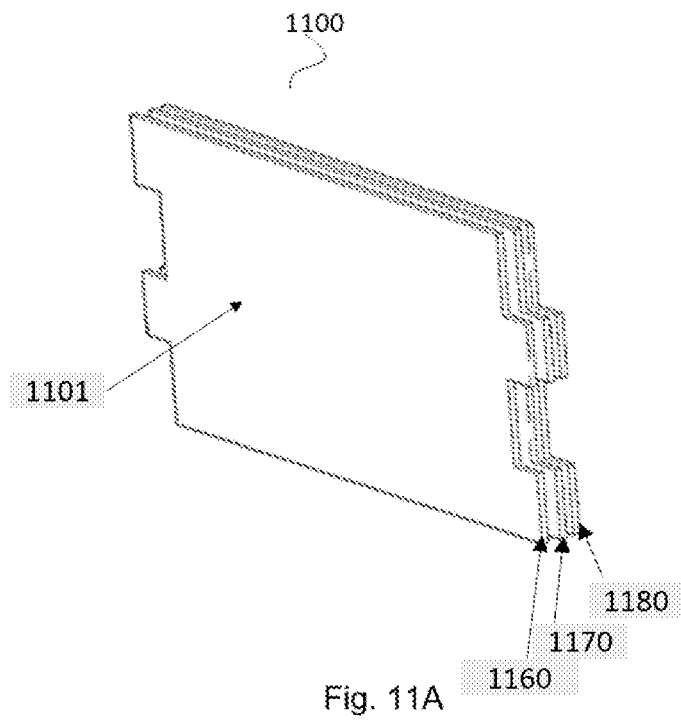
FIG. 11A is a perspective view of a panel according to another embodiment of the present invention depicting the top layer.
Figure 11B:
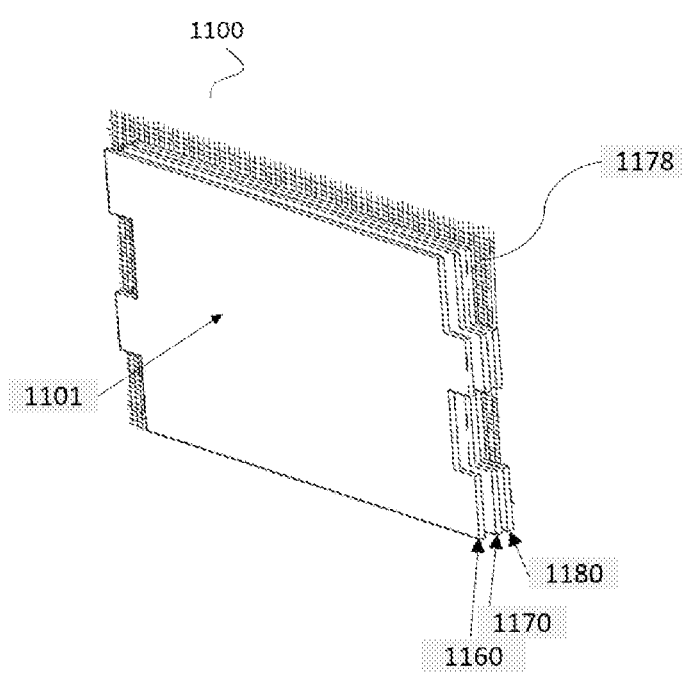
FIG. 11B is a perspective view of a panel according to another embodiment of the present invention depicting the top layer and a mesh.

The top layer 101 provides the looks of the panel, the middle layer 102 and the base layer 103 may be made of the same or different materials. The base layer 103 may provide insulation and/or structure, while middle layer 102 provides the connection between the top layer 101 and base 103 layer. As illustrated in the embodiment of FIGS. 11A-B, the middle layer and the base layer may not be necessary if, for example, insulation is not required. In FIGS. 11A-B, the panel 1100 consists of only the top layer 1101 (FIG. 11A) or the top layer 1101 and a mesh 1178. In FIGS. 11A-B the top, multi-film layer comprises the substantially transparent coat 1160, the granular coat 1170 and the background color coat 1180. In FIG. 11B, the mesh 1178 is connected to the second surface of the background color coat 1180.

Double Interlock System

In the embodiment illustrated in FIGS. 1A and 1B, the perimeter of a modular panel 100 may include interlocking systems. In the case of a modular panel 100, at least two sides of the external layer 101 may include first and second connecting profiles or attachment mechanisms 15a,b. The first connecting profile or attachment mechanism 15a is disposed on a side of the panel 100 to interlock with a corresponding second connecting profile or attachment mechanism 15b on an adjacent panel and retained.

The connecting profiles 15a,b of the modular panel 100 may include flanges 115 and pockets 16 formed about the sides of the body 10. The flanges 115 and pockets 16 are adapted to fit together with mating flanges and pockets of an adjacent panel.

Figure 6A:
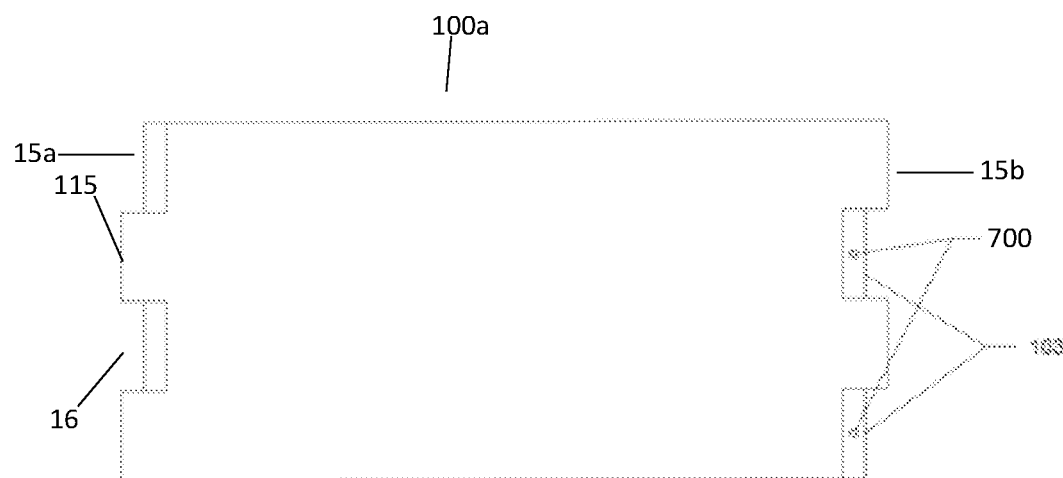
FIG. 6A is a pattern diagram depicting the double interlock system on the modular panels during the installation on the support according the present invention.
Figure 6B:
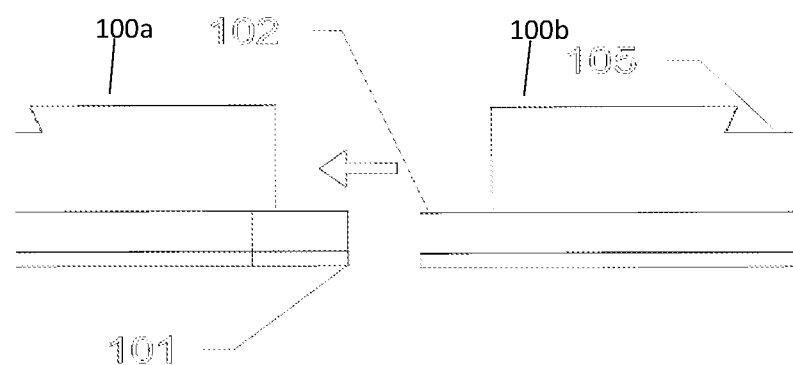
FIG. 6B is a pattern diagram depicting the double interlock system on the modular panels during the installation on the support according the present invention.

With reference to FIG. 6, in the case of modular panels 100a,b with an insulating layer 103, the bottom surface of pocket 16 may be formed by the insulating layer (see FIG. 6A). When the modular panel 100a is attached to a substrate, the panel may be secured by screws 700 through the bottom surface of pocket 16 to the substrate. When the flange of a neighboring panel 100b interlocks with the pocket 16 of the panel 100a screwed to the substrate, the flange of the neighboring panel 100b will hide the screw 700. Both module 100a,bs, will have a double interlock and will hide the screws 700 that will attach one of the said modules 100a to the substrate, and hold in place the next one 100b (see FIG. 6A and FIG. 6B).

Interlock with Expansion Joint System

In another embodiment, illustrated in FIG. 4 and FIG. 7A-E, the perimeter of the top layer 101 may include interlocking flanges 115 to connect to adjacent panels 100a,b as explained above and pockets 16. The profile of the base layer 103 may include a dovetail shape 122. Kind of usable shape in preparing said dovetail shapes are not particularly limited. Examples of such shape, which are usable herein, may include an, "T", "V" shape (see FIG. 4 and FIG. 7). In this case, the pocket 16 lacks a bottom surface, as the base layer 103 does not extend. A connector 106 is provided for each direction and having a dovetail shape complementary to the dove tail shape of the base layer 103. The connector includes a first face 107. As such, the connector 106 may be positioned next to the base layer 103 as shown in FIGS. 7A-C, and the first face 107 of the connector 106 will serve as the bottom surface of the pocket 16. Once secured, through screws 700 for example, to a substrate (floor, wall or pitch of the roof and so forth), will lock the module 100a to the previously mentioned support (see FIG. 4). The next module 100b, joining to said connector 106 with its interlocks, will cover any joints (screws 700) on the connector 700 and engage onto with the module 100a already locked to the support and leaving a gap 701 between the interlocks (see FIGS. 7D-E). Said connector 106, includes an exposed face 107 and in contact with said interlocks of external multi-films layer of said module. Said exposed face 107, may, in one embodiment, be covered with the same compound used to create grout as described herein below. Said connector 106 acts both as an expansion joint and joint the interlocks of the modules 100a,b connected, covering said gap 701 and maintaining the continuity of said grout of the modules 100a,b.

Method of Producing the Panels

The methods for producing the panels of the present invention will be now described with reference to FIGS. 1A, 1B, 2, 3, 4, 5, 6A, 6B, 8 and 9.

Figure 8:
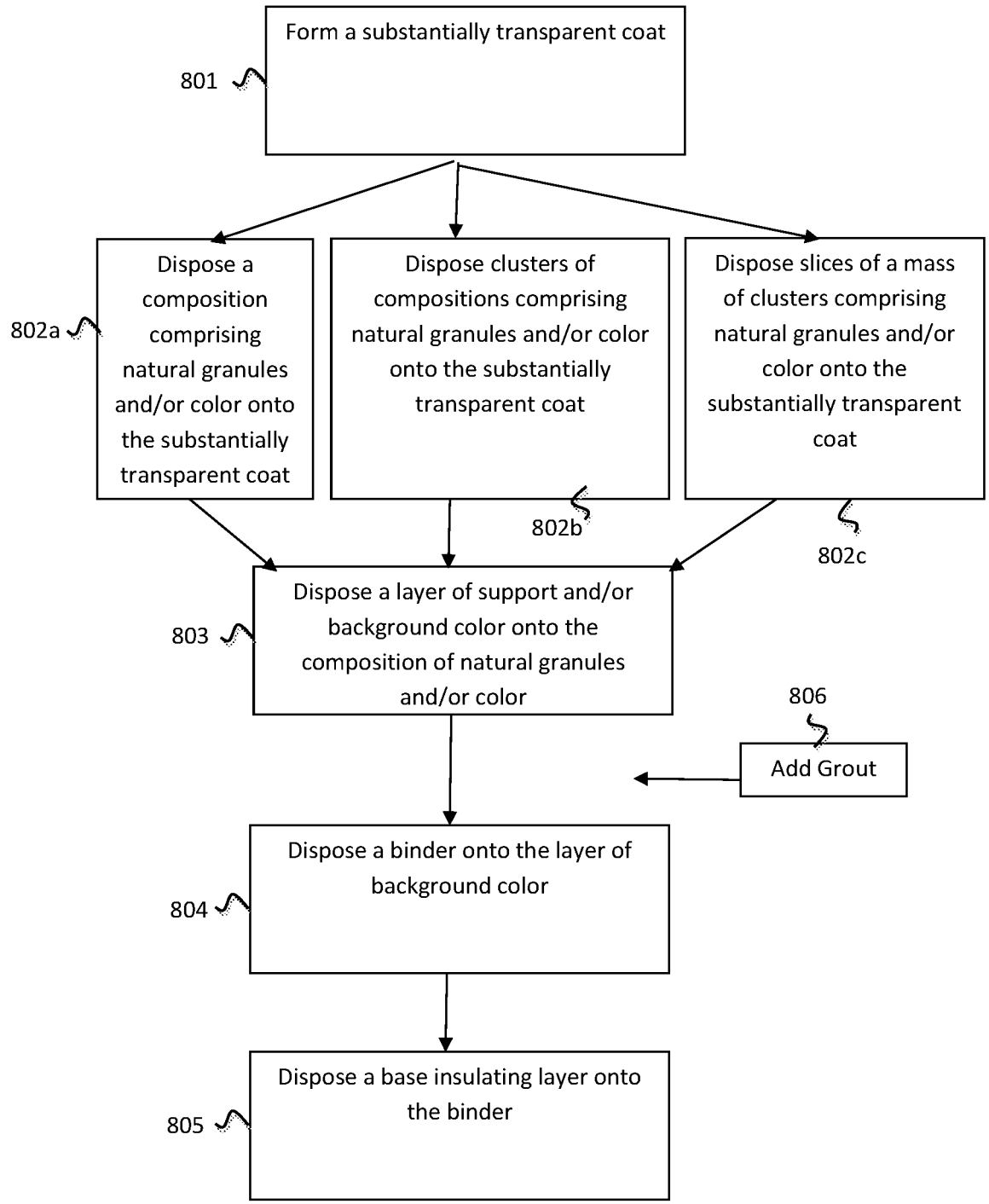
FIG. 8 is a flowchart of a method, according to one embodiment, of producing a panel of the present invention.

FIG. 8 shows a general flow chart of the method in accordance to one embodiment: (a) forming a substantially transparent coat (801); (b) dispose one, two or three of: a composition comprising natural granules and/or color onto the substantially transparent coat (802a), and/or clusters of compositions comprising natural granules and/or color onto the substantially transparent coat (802b), and/or slices of a mass of clusters comprising natural granules and/or color onto the substantially transparent coat (802c); (c) dispose a support and/or background layer onto the composition of natural granules and/or color (803); (d) dispose a binder onto the layer of support and/or background color (804); and (e) dispose a base layer onto the binder (805).

The present invention includes, in one embodiment, a method to produce the panel 100 of the present invention. The method for the production of said panel 100 may be divided into phases, which will produce at least three layers of which the panel (or modules) is/are comprised: a top multi-films layer 101, a middle layer 102, and a base layer 103. An optional step of adding grout (806) is also depicted between steps 803 and 804.

The method to produce a panel of the present invention includes the use of a mold 1200. With reference of FIG. 12, the mold 1200 comprises a continuous side wall 1201 forming the perimeter of the mold 1200 and a base 1205. The interior surfaces of the walls and the base 1205 form the mold's cavity 1202. The interior surface of the base forms the cavity's floor.

The floor of the mold cavity 1202 will create the shape or silhouette of the external multi-film layer 101 of said panel. Said mold 1200 can be made in different material: semi-hard, soft or hard, perennial or not perennial. Said floor of the mold's cavity 1202 includes a shape or silhouette. Said shape may include interlocks 115 and pockets 16 on the top multi-films layer 101 of said panel that will match and connect multiple modules (see FIG. 5). Said mold 1200 can be closed with a counter mold or opened, without a counter mold. Said mold includes a case to hold one or more molds.

If it is intended to produce the above-mentioned system, the molds may need to be created at least four molds, that are able to produce modules having dimensions according to said criterion and interlocks 115, on two or more sides distributed asymmetrically (see FIG. 1A). The mold 1200 may be made of any suitable materials (metal, plastic silicon, wax etc.). The interior bottom surface of the mold 1200 will replicate the negative shape of the wanted configuration of the panel. For example, in the case of a flag-stone or brick, the bottom surface of the mold 1200 may present depressions, and textures for the correspondent stones or bricks and ribs 1203 separating the depressions for forming the groves in between the flag stones.

First Phase: The Top Layer

The top, multi-film or multi-coat layer 101 may be created with at least three different methods.

Figure 9:
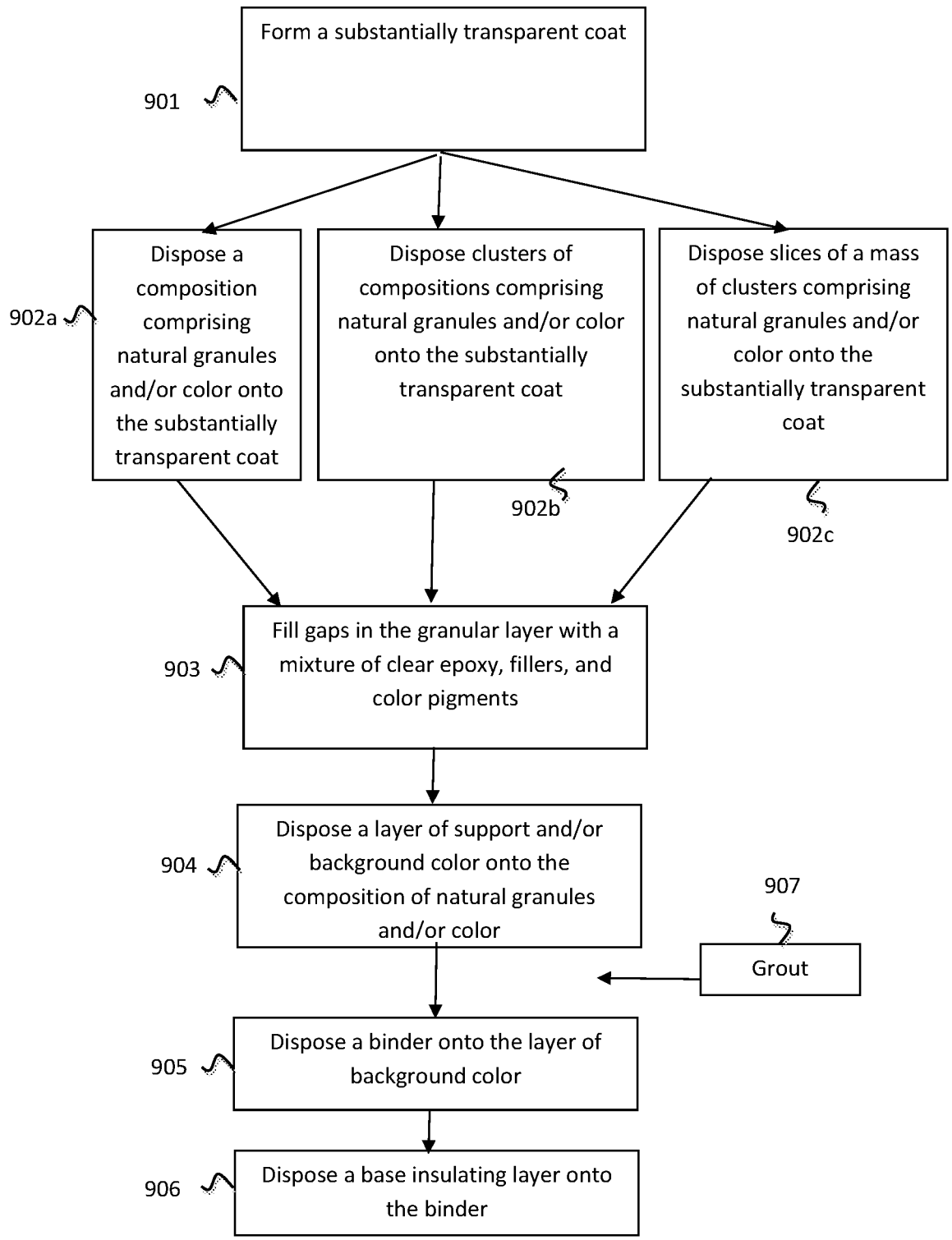
FIG. 9 is a flowchart of a method, according to one embodiment, of producing a panel of the present invention.

In FIGS. 8 and 9, steps 802 and 902 illustrate three options: 802a/902a, 802b/902b and 802c/902c respectively. Each option represents the three methods described herein below. It should be understood that anyone or any combination of these three options may be used. For example, one may dispose cluster of compositions and slices of a mass of clusters.

The first two steps are common to all three methods:
1. Spread a release-agent on the interior surfaces of a mold (surfaces within the cavity of the mold), to form a release-agent coat.
2. Spread onto the release-agent coat, a coat of a substantially transparent polymer to form the substantially transparent coat 116 of the top layer 101 (see 801/901).

The use of a release agent facilitates the removal of the panels from the mold. However, it should be understood that this step may not be necessary. The release agent may include different compositions like liquid, gel, and dust. The shape, the form and the texture of the external surface 134 of the top layer 101 of the module 100, will be influenced by the release agent.

Kind of usable substantially transparent polymer in preparing said substantially transparent coat 116 are not particularly limited. Examples of such substantially transparent polymer, which are usable herein, may include one or more of an acrylic resin, an unsaturated polyester resin, an epoxy resin and a melamine resin, a urethane resin. Specific kinds of said acrylic resin are not particularly limited. For example, a polymer of one or more acrylic monomers of methyl (meth) acrylate, ethyl (meth)acrylate, butyl (meth) acrylate, 2-ethylhexyl (meth)acrylate, benzyl (meth)acrylate and glycidyl (meth)acrylate may be used. Kinds of said unsaturated polyester resins are also not particularly limited. For example, a polyester resin having an acid value of 5 to 40 and a weight average molecular weight of 1,000 to 5,000, which is prepared through a condensation reaction of an unsaturated dibasic acid or a mixture of said dibasic acid and saturated dibasic acid with a polyhydric alcohol, may be used. At this time, the process for preparing said polyester resin is not particularly limited. For example, it may be prepared by a method which comprises a step of mixing said dibasic acid and the like with said polyhydric alcohol in a specific ratio (for example, moles of alcoholic hydroxide group/moles of carboxylic group=0.8 to 1.2), subjecting said mixture to a condensation reaction at a temperature of about 140 to about 250° C. under an inert gas flow such as carbon dioxide gas and/or nitrogen gas with removing resulting water and slowly increasing the temperature depending on degree of proceeding the reaction. Examples of unsaturated dibasic acids or saturated dibasic acids as used above may include maleic anhydride, citraconic acid, fumaric acid, itaconic acid, phthalic acid, phthalic anhydride, isophthalic acid, terephthalic acid, succinic acid, adipic acid, sebasic acid and/or tetrahydrophthalic acid, and the like. Examples of polyhydric alcohols may include ethylene glycol, diethylene glycol, triethylene glycol, propylene glycol, dipropylene glycol, tripropylene glycol, polypropylene glycol, 1,3-butylene glycol, hydrogenated bisphenol A, trimethylol propane monoarylether, neopentyl glycol, 2,2,4-trimethyl-1,3-pentanediol and/or glycerine, and the like. If necessary, said polyester resin may further comprise a monobasic acid such as acrylic acid, propionic acid and/or benzoic acid; or polybasic acid such as trimellitic acid and/or benzene tetracarboxylic acid. In addition, kinds of usable epoxy resins are also not particularly limited. For example, a bifunctional or multifunctional epoxy resin may be used. Examples of said bifunctional or multifunctional epoxy resins may include one or more of a bisphenol A epoxy resin, a bisphenol S epoxy resin, a tetraphenyl ethane epoxy resin and a phenol novolac epoxy resin.

(i) First Method of Making the Top Multi-Film Layer 101
  1. Spread a release-agent on the interior bottom surface of the mold, to form a release-agent coat.
  2. Spread onto the release-agent coat, a coat of a substantially transparent polymer to form the substantially transparent coat 116 (801/901).
  3. Overlay or dispose a composition comprising natural granules and/or color onto the substantially transparent polymer coat 116, preferably before it hardens, to form a film or coat of granules and/or color 117 (802*a*/902*a*).

The granular/color layer may be made of desired color pigments, and may include natural granules to provide a more genuine look. The color layer may pre-made.

Natural granules that may be used in this method or any of the methods described below includes one or more additives of an inorganic filler, a cross-linking agent, a cross-linking accelerator and a pigment, in addition to the above described components. Specific kinds of the inorganic fillers above are not particularly limited. Examples of these inorganic fillers may include one or more of calcium carbonate, silica and silica derivatives, metal hydroxide, minerals, glass and alumina. Specific sizes of the inorganic fillers are not particularly limited and it can be use any sizes ranging from 0.05 mm to 20 mm in diameter. For granular look, bigger sizes, for a smoother look, smaller sizes. The nuance-color can be laid, using different colors, layer by layer or stone by stone: one may lay the color layer in a non-uniform way, or stone by stone so as to imitate the original brick, marble and so forth.

The following are the ingredients that can be used to prepare different colors that may be used:

Nuance-Color for flag-stone: Pink corallo marble, white Carrara, gray occhialino dust (size 0.7-1.2 mm)

Nuance-Color for brick: black ebano marble dust (size 0.7-1.2 mm)

Base-color for flag-stone: a mix in ratio in weight of 1 to 10 in dust of pink corallo and white Carrara (size 0.7-1.2 mm)

Base-color for brick: red Verona marble dust (size 0.7-1.2 mm)

(ii) Second Method of Making the Top Multi-Film Layer 101
Materials:
  Prepare granular mixtures in ratio of 1 to 6 of clear epoxy and marble dust of one, two, three or more different color, like Pink corallo marble, white Carrara, gray occhialino dust (diameter size 0.7-1.2 mm). Create granular clusters of one or different colors and sizes with the mixtures.

Optionally, prepare a liquid mixture of a clear epoxy and color pigments.
Steps:
  1. Spread a release-agent on the interior bottom surface of the mold, to form a release-agent coat.
  2. Spread onto the release-agent coat, a coat of a substantially transparent polymer to form the substantially transparent coat 116 (801/901).
  3. Fill the mold with the granular clusters in a uniform or no-uniform way (802*b*/902*b*). If a liquid mixture is provided, the liquid mixture may be interposed in the gaps between granular clusters (903). This liquid mixture may be used to form the veins of marble or granite. The granular clusters with or without the liquids will form the granular coat 117.

This second method may be used to replicate granite (if the diameter of the clusters is in range of 1 mm to 20 mm in diameter) and marble (if the diameter of the clusters is sized above 20 mm in diameter).

An optional polishing phase with a final coat of acrylic resin will lighten up the nature of the vein.

(iii) Third Method of Making the Top Multi-Film Layer 101

This method may be suitable for creating slabs, which can be used to create table-tops, countertops, tomb stones, and so forth. This third method may give a similar result as the above method 2 without a need to add the polishing phase with the final coat of acrylic resin.
Materials:
  Prepare one, two, three or more mixtures in ratio of 1 to 6 of clear epoxy and marble dust of one or different colors, like Pink corallo marble, white Carrara, gray occhialino dust (size 0.7-1.2 mm). Create clusters of different color and sizes with the mixtures.

Optionally prepare a liquid mixture of clear epoxy and pigments color

3. Create a granular mass, for example by laying the clusters of one or different colors one on each other, in a no-uniform way, optionally interposing the liquid mixture in the gaps between the clusters.
Steps:
  1. Spread a release-agent on the interior bottom surface of the mold, to form a release-agent coat.
  2. Spread onto the release-agent coat, a coat of a substantially transparent polymer to form the substantially transparent coat 116 (801/901).
  4. Cut the mass of clusters in slices. If liquid mixture is used, then every slice will show veins marble like or granite like (it will depend on the diameter size of the clusters).
  5. Position the slices onto the substantially clear coat in the mold, in a uniform or a no-uniform way to form the granular coat 117 (802*c*/902*c*).

Method 3 can be used to replicate granite (if the diameter of the clusters is in range of 1 mm to 20 mm) and marble (if the diameter of the clusters is above 20 mm in diameter).

In option polishing phase with a final coat of acrylic resin will lighten up the nature of the vein.

The final step, common to all of methods 1-3 is to overlap a film or coat of mechanical support and/or of background color, preferably, before the granular coat hardens, to form the support layer 118, which may provide background color (803/904). This support layer 118 may be a mixture, preferably 1 to 3 in weight, of a clear epoxy and a base color.

The film 118 of mechanical support and/or of background color may be made of a single component or a mixture of components. Said components may include binders and fillers. Said binders include, in measure of weight of 15% to 35%, of a substantially transparent polymer. Kinds of usable substantially transparent polymer in preparing said binders are not particularly limited. Examples of such substantially transparent polymer, which are usable herein, may include one or more of an acrylic resin, an unsaturated polyester resin, an epoxy resin and a melamine resin, a urethane resin. Specific kinds of said acrylic resin are not particularly limited. For example, a polymer of one or more acrylic monomers of methyl (meth) acrylate, ethyl (meth) acrylate, butyl (meth) acrylate, 2-ethylhexyl (meth) acrylate, benzyl (meth) acrylate and glycidyl (meth) acrylate may be used. Kinds of said unsaturated polyester resins are also not particularly limited. For example, a polyester resin having an acid value of 5 to 40 and a weight average molecular weight of 1,000 to 5,000, which is prepared through a condensation reaction of an unsaturated dibasic acid or a mixture of said dibasic acid and saturated dibasic acid with a polyhydric alcohol, may be used. At this time, the process for preparing said polyester resin is not particularly limited. For example, it may be prepared by a method which comprises a step of mixing said dibasic acid and the like with said polyhydric alcohol in a specific ratio (for example, moles of alcoholic hydroxide group/moles of carboxylic group=0.8 to 1.2), subjecting said mixture to a condensation reaction at a temperature of about 140° C. to about 250° C. Under an inert gas flow such as carbon dioxide gas and/or nitrogen gas with removing resulting water and slowly increasing the temperature depending on degree of proceeding the reaction. Examples of unsaturated dibasic acids or saturated dibasic acids as used above may include maleic anhydride, citraconic acid, fumaric acid, itaconic acid, phthalic acid, phthalic anhydride, isophthalic acid, terephthalic acid, succinic acid, adipic acid, sebasic acid and/or tetrahydrophthalic acid, and the like. Examples of polyhydric alcohols may include ethylene glycol, diethylene glycol, triethylene glycol, propylene glycol, dipropylene glycol, tripropylene glycol, polypropylene glycol, 1,3-butylene glycol, hydrogenated bisphenol A, trimethylol propane mono-arylether, neopentyl glycol, 2,2,4-trimethyl-1,3-pentanediol and/or glycerine, and the like. If necessary, said polyester resin may further comprise a monobasic acid such as acrylic acid, propionic acid and/or benzoic acid; or polybasic acid such as trimellitic acid and/or benzene tetracarboxylic acid. In addition, kinds of usable epoxy resins above are also not particularly limited. For example, a bifunctional or multifunctional epoxy resin may be used. Examples of said bifunctional or multifunctional epoxy resins may include one or more of a bisphenol A epoxy resin, a bisphenol S epoxy resin, a tetraphenyl ethane epoxy resin and a phenol novolac epoxy resin. Furthermore said film of mechanical support and of background color include, a foamed material and/or natural granules. Examples of said foamed material include foamed polymers and foamed cementous materials with inorganic fillers. Specific kinds of cementous materials are not particularly limited. Examples of these cementous materials may include one or more of cellular concrete Gypsum (GRG) and so on. Moreover, said fillers of the above mixture, includes natural granules in measure of weight of 65% to 85%. Natural granules include one or more additives of an inorganic filler, a cross-linking agent, a cross-linking accelerator and a pigment, in addition to the above described components. Specific kinds of the inorganic fillers are not particularly limited and they can be used in any particle sizes ranging from 0.05 mm to 20 mm in diameter. Examples of these inorganic fillers may include one or more of calcium carbonate, silica and silica derivatives, metal hydroxide, minerals, alumina and fire retardant additive, flame retardant additives or incombustible additive.

Grout

Figure 12:
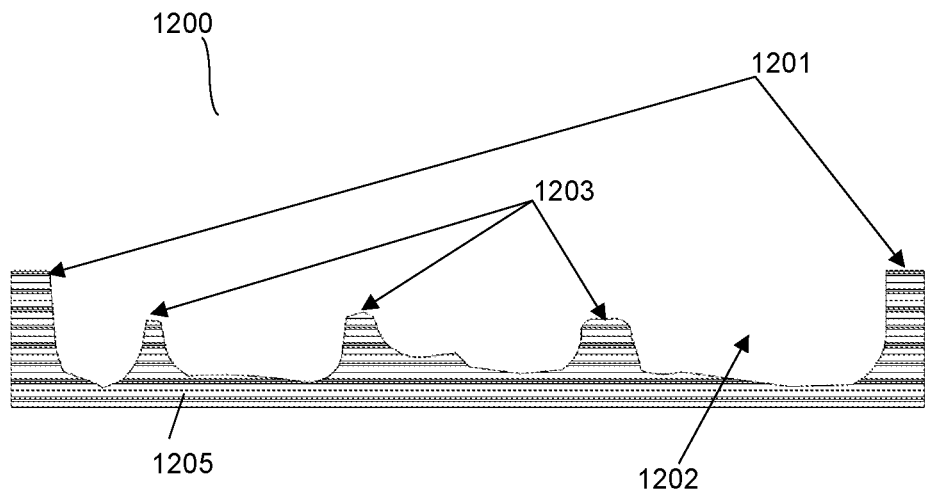
FIG. 12 is a cross section from top to bottom of a mold to create a panel according to another embodiment of the present invention.

If grout is desired in between the bricks or marble stones, to have the color of said grout independently from the rest of the stone, one may proceed as follow:

To recreate grout, a mold, such as the mold 1200 depicted in FIG. 12, may be provided with ribs 1203 extending from the cavity's floor. The top surface of the ribs 1203 protruding from the floor of the mold's cavity 1202 may be cleaned or scraped from the materials that were laid in the previous steps (methods 1-3). Alternatively, the top surface of the ribs 1203 may be masked, and the mask removed thereby leaving a clean surface on the ribs 1203. The materials/compositions used to create said mask are not particularly limited. Examples of these materials may include one or more metals, papers, plastic, wood, paint and composites.

1. Clean the ribs 1203 of the mold 1200 where the shape represent the grout.

Specific processes of how to clean said mold where the shape represent the grout are not particularly limited. Examples of these processes may include scraping out the excess of the materials above described to create said external multi-films layer in the present method.

2. Overlay a composition comprising the color of the preferred grout on the top surface of the ribs 1203 to create said external multi-films layer in the present method (806/907). For example, a mix in ratio 1 to 4 in weight of clear epoxy with the grout (grey occhialino marble dust (size 0.7-1.2 mm)) and lay it on the ribs 1203; allow the layers to combine and leave it until it cures.

Second Phase: The Base Layer 103 The second phase relates to the preparation of the base layer 103. Kind of usable material in preparing said base layer are not particularly limited. Examples of such materials, which are usable herein, may include one or more of an insulating and a structuring material. Specific kinds of said insulating material are not particularly limited. For example extruded polystyrene, (XPS). Expanded polystyrene (EPS) Molded expanded polystyrene (MEPS), polyisocyanurate, polyisocyanurate insulating material in structural insulated panels (sips) polyurethane, cementitious foam, cellular glass, vermiculite, may be used. This base layer 103 includes a shape or silhouette. The base layer 103 includes a first surface or face that is adjacent to the inner or middle layer, and a second surface or face 108 and functions as back to the module, which is in contact with the support (for example wall, roof, etc.). Said silhouette includes a number of ventilation channels 105. Said ventilation channels 105 have a shape. (See FIG. 2). Kinds of usable shape in preparing said ventilation channels are not particularly limited. Examples of such shape of ventilation channels, which are usable herein, may include an interlocking dovetail, "T", "V" shape 105 may be used (see FIG. 4). The face 108 of layer 103 faces the structure. Said channels 105 may be configured to receive components 104 capable of merging to said channels including an interlocking clips 104 (see FIGS. 2 and 3). Kinds of usable material in preparing said components are not particularly limited. Examples of such material like, polymeric structural material and metal may be used. Said components 104 may be independently secured to the support of the structure, such as a house. The panels may then be secured to the components 104 by inserting or sliding the components 104 into the channels 105 which will lock the module to the same support (see FIG. 3). Said silhouette of said base layer 103, comprises a different combination of profiles. The present invention includes multiple systems to install said module to the support (for example wall, roof, etc.) According to the system chosen, the base layer may possibly have different profiles of said silhouette.

Third Phase: Assembly of the Base Layer 103 to the Top Layer 101

The third phase includes the assembly of the base layer 103 already prepared, to the top multi-films layer 101, through the creation of the middle layer 102 (see FIG. 1). The assembly includes a layering of foaming or non-foaming binder directly on the second surface of the multi-films layer 101 while is still in the mold (804, 905). Kind of usable foaming binder to assemble the above layers are not particularly limited. Examples of such foaming binder, which are usable herein, may include Polymer foam, cellular cement. The base layer 103 is then disposed onto the binder (805, 906).

Figure 13A:
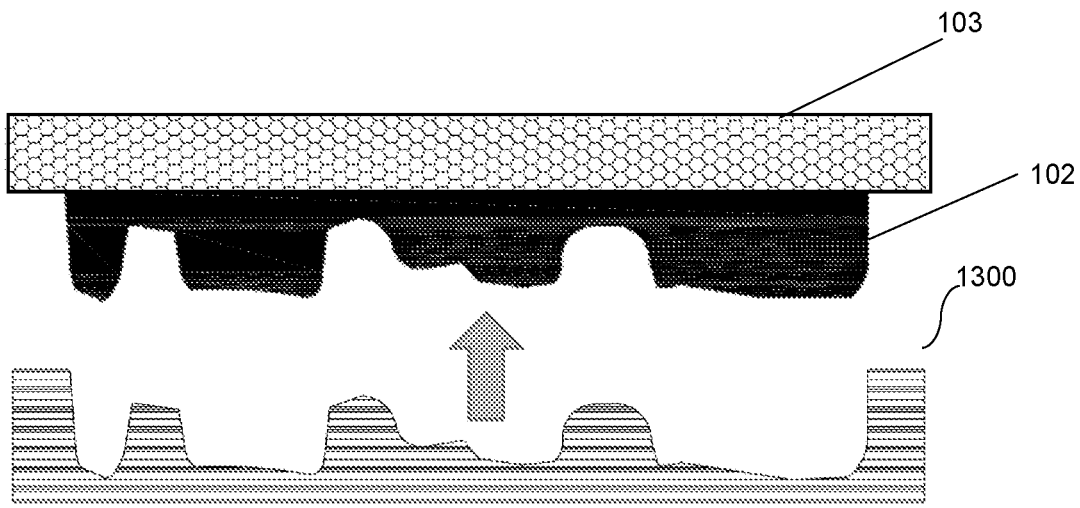
FIG. 13A, B are cross section from top to bottom of molds to create a panel according to another embodiment of the present invention.
Figure 13B:
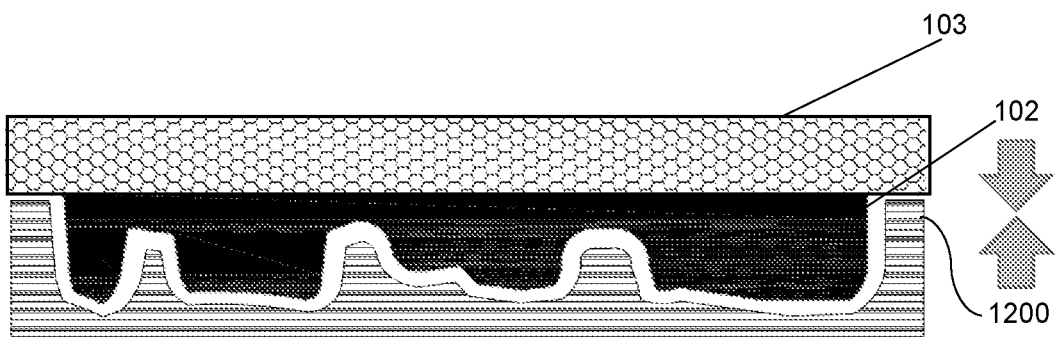

To speed up the production, it is possible to use the middle layer 102 as a counter-mold for the curing time of the external multi-films layer, as illustrated in FIG. 13B. In order to proceed in this manner, a second mold 1300 that has the shape of the middle layer 102 and fits within the first mold 1200 can be used. The foaming or non-foaming binder that makes the middle layer is poured into this second mold 1300. The base 103 is then placed on top of the middle layer 102 before is cured. After the middle layer 102 is cured and bound to the base layer 103, the middle layer 102 with the bound base layer 103 is demolded from mold 1300 (as shown by the arrow in FIG. 13A) and placed on the top the multi-films layer (i.e. on top of the layer 118) during the multi-film layer 101 curing time, as shown in FIG. 13B. The first mold 1200 is thereby closed with the middle layer 102 bound to the base 103, and the external multi-films layer becomes a binder to the middle layer 102.

Another option instead of a binder is to increase the volume of the grout or the background layer. This may be achieved by preparing a composite in a ratio (in weight) of about 1 of clear epoxy to 4 of a mixture, the mixture having a ratio of about 1 to 1 in weight of grout (grey occhialino marble dust (diameter size 0.7-1.2 mm)) or background color (marble dust (size 0.7-1.2 mm)), with micro balloon of glass (size between 0.3-3 mm) or silica fume, and lay this composite on the granular film 117, and cover the composite with the base of polystyrene 103 and close firmly the lid of the mold until it cures.

Furthermore, to speed up the curing time of the different layers, another optional phase may be to expose the different layers to a temperature in the range of about 50° C. to about 150° C.. This heat may be applied by inserting the mold in an oven, or may be applied to the bottom of the mold (with a heating element, heating lamp, heated air and so forth), or to the top of the mold (with a heating element, heating lamp, heated air, and so forth), or to the inside of the mold (heated air, heating lamp, infrared rays, and so forth), and/or of the mold itself and/or the surrounding area during the process.

With reference to FIG. 10, in the preparation of the layer 101, a mesh (metal mesh or fiber fabric mesh such as carbon, glass or Kevlar™ or any other non-combustible material) could be added and immersed in the background layer (or in the grout if one is provided) while is still wet (not cured yet) in measure to exceed from the surface 137, an adequate braces or brackets that can be screwed to the support during the installation process.

As such, in one embodiment, the present invention provides for a cladding panel for covering a substrate, the cladding panel comprising:

(a) a body comprising a top face which provides a viewable surface and a bottom face, at least a first edge and a second edge with a first connecting profile and a second connecting profile respectively, and a mesh, the first connecting profile and the second connecting profile being complementarily shaped in such a way that adjacent cladding panels are coupled to one another via said first connecting profile and the second connecting profile, each of the first connecting profile and the second connecting profile comprising a pocket and a flange, the pocket of the first connecting profile being shaped for receiving the flange of the second connecting profile, (b) a base layer for attachment of the cladding panel to the substrate, and (c) a middle layer disposed between the bottom face of the body and the base layer, wherein the mesh and the base layer overhang the pocket of the first connecting profile and the pocket of the second connecting profile such as forming a viewable bottom surface of the pocket of the first connecting profile and of the pocket of the second connecting profile, the viewable bottom surface being configured to receive fasteners and to act as a double interlock and sealant when adjacent cladding panels are coupled to one another via said first connecting profile and the second connecting profile.

In one embodiment of the cladding panel, the base layer comprising an insulating material and the middle layer comprising a foaming binder, the base layer having a first face connected to the middle layer and a second face for connecting to the substrate, the second face of the base layer having one or more ventilation channels.

In another embodiment of the cladding panel, the base layer has sides having a dovetail shape designed for receiving a connector element.

In another embodiment of the cladding panel, the viewable surface of the top face includes groves that simulate grout.

In another embodiment of the cladding panel, the viewable surface includes artificial depressions and textures that replicate depressions and textures of a natural stone.

In another embodiment of the cladding panel, the body comprises a multifilm layer of overlapping films arranged in this order from the top face to the bottom face: an external transparent film, a film of granules and a support film that provides mechanical support to the panel and forms the bottom face of the body, wherein the external transparent film comprises a transparent polymer, the film of granules comprises dust filler, a cross-linking agent, a cross-linking accelerator and a color pigment, and the support film comprises binders, fillers and dyes, and wherein the mesh is immersed in the support film.

Kit or System

A kit or system according to one embodiment of the present invention includes a number of at least four modules of the present invention with substantial coordinated sizing under a criterion disclosed in the present invention. The use of said criterion is not particularly limited to said insulation system. It may include one or more of construction paneling and module, structure, furniture and so on. Said criterion is described as follows:

Given a positive integer number, the sum of a multiple of said given number with a positive multiple for each of the three following consecutive integers, is capable to suit any number positive integer, greater than or equal to three times the given number. According to this criterion, assuming 12 as the given number, the three following numbers will be 13, 14, and 15. The sum of the positive multiples of these four numbers will be able to reach any chosen positive integer number greater than 36 (3 times 12).

On Table 1 random positive integer numbers are reached using the above criterion. In the top row, "a" represents the given number (12), "x" represents the random number and n is a number used to minimize the multiple of the given number (12); in this table, "n" was chosen to be equal to 4. The numbers "a+1", "a+2", and "a+3", represent respectively the consecutive numbers of 12 (13, 14, and 15). On said table 1, the above numbers "a" "a+1", "a+2", and "a+3", represent possible different widths of the modules while "x" represent possible different widths of the surface where the modules will be installed. All the widths are expressed in inches. As it can be noticed, the criterion fulfills any random number (widths of surfaces) equal or greater than three times the given number; in this case, all widths greater than 36 inches.

TABLE 1

| a amount of 12-inch modules | a + 1 amount of 13-inch modules | a + 2 amount of 14-inch modules | a + 3 amount of 15-inch modules | n(a) amount of 48-inch modules | x >= 3a Random size in inches |
|---|---|---|---|---|---|
|   | 4 |   |   | 19 | 964 |
|   | 3 |   |   | 14 | 711 |
| 3 | 1 |   | 2 | 4 | 271 |
| 2 | 1 | 1 |   | 12 | 627 |
| 1 |   |   | 1 | 18 | 891 |
|   |   | 3 | 1 | 15 | 777 |
|   |   | 7 |   | 17 | 914 |
|   | 3 |   |   | 11 | 567 |
|   | 2 |   | 1 | 38 | 1865 |
|   |   | 8 | 1 |   | 127 |
|   |   |   | 2 | 2038 | 97854 |
|   | 1 | 4 |   | 3 | 213 |
| 3 |   |   | 2 | 9 | 498 |
| 2 | 1 |   |   |   | 37 |
|   |   |   | 1 | 2 | 111 |
| 3 |   |   | 3 | 14 | 753 |
|   |   | 8 |   |   | 112 |
|   |   | 5 |   | 9 | 502 |
| 1 |   |   | 1 | 8 | 411 |
|   |   |   | 2 | 32 | 1566 |
|   |   | 2 | 2 | 2 | 154 |
|   | 3 |   |   | 4 | 231 |
|   |   | 5 | 1 | 16 | 853 |
|   |   |   | 2 | 7 | 366 |
|   | 1 | 3 |   | 3 | 199 |
|   | 1 | 3 |   | 17 | 871 |
|   |   | 4 |   | 17 | 872 |
|   |   | 3 | 1 | 17 | 873 |
|   |   | 2 | 2 | 17 | 874 |

The following examples are intended to illustrate, and not limit the embodiments disclosed herein.

EXAMPLES

Description of the Mold

The mold made by any materials (metal, plastic silicon, wax, etc.) will replicate the negative shape of the wanted figure. In case of the above flag-stone or brick, the mold will present depressions, and texture for the correspondent stones or bricks and ribs for the groves in between.

Example 1

Preparation
1. Create a case with a lid to contain the shape and measure of the mold.
2. Put the mold in the case and live the lid opened.
3. Spread a release-agent on the surface of the mold
4. Nuance-Color for flag-stone: prepare, Pink corallo marble, white Carrara, gray occhialino dust (size 0.7-1.2 mm)

Nuance-Color for brick: prepare black ebano marble dust (size 0.7-1.2 mm)
5. Base-color for flag-stone: prepare, a mix in ratio in weight of 1 to 10 in dust of pink corallo and white Carrara (size 0.7-1.2 mm)

Base-color for brick: prepare red Verona marble dust (size 0.7-1.2 mm)
6. Spread in the mold a clear coat of epoxy.
7. While the coat is still wet, lay a non-uniform layer of Nuance-Color on the mold.

The Nuance-Color can be laid, using different colors, layer by layer or stone by stone.
8. Prepare a mix in ratio 1 to 3 in weight of clear epoxy with base-color and lay it on the mold.
9. Clean in different ways (scraping, use mask) the ribs of the mold.
10. Prepare a mix in ratio 1 to 4 in weight of clear epoxy with the grout (grey occhialino marble dust (size 0.7-1.2 mm)) and lay it on the ribs; allow the layers to combine and leave it until it cures.
11. Prepare a sheet of polystyrene in measure to cover the mold.
12. Prepare a solution of foaming glue/binder, such as liquid polyurethane, in measure that when react, the foam produced will fill completely the mold.
13. Cover the mold with the sheet of polystyrene and close firmly the lid of the case on it until it cures.

After step 9 a preferred option is:

Prepare a mix in ratio 1 to 4 in weight of clear epoxy with a mix in ratio 1 to 1 in weight of grout (grey occhialino marble dust (size 0.7-1.2 mm)) with micro balloon of glass (size between 0.3-3 mm) or silica fume and lay it on the mold filling it completely and cover it with the sheet of polystyrene and close firmly the lid of the case on it until it cures.

Example 2

After release agent and clear coat, instead of color layer of Example 1, prepare
1. Create a case with a lid to contain the shape and measure of the mold.
2. Put the mold in the case and live the lid opened.
3. Spread a release-agent on the surface of the mold
4. Spread in the mold a clear coat of epoxy.
5. Prepare three or more mixtures in ratio of 1 to 6 of clear epoxy and marble dust of three or more different color, like Pink corallo marble, white Carrara, gray occhialino dust (size 0.7-1.2 mm).
6. Prepare a liquid mixture of clear epoxy and pigments color
7. Create clusters of different color and sizes with the mixtures
8. Fill the depressions in the mold with the above clusters in a non-uniform way, interposing the liquid mixture in the gaps between them.
9. Clean in different ways (scraping, use mask) the ribs of the mold.
10. Prepare a mix in ratio 1 to 4 in weight of clear epoxy with a mix in ratio 1 to 1 in weight of grout (grey occhialino marble dust (size 0.7-1.2 mm)) with micro balloon of glass (size between 0.3-3 mm) or silica fume and lay it on the mold filling it completely and cover it with the sheet of polystyrene and close firmly the lid of the case on it until it cures.

The solution of Example 2 can replicate granite (if the diameter of the clusters are in range of 1 mm to 20 mm) and marble (if the diameter of the clusters are bigger without limit).

Optionally, a polishing phase with a final coat of acrylic resin will lighten up the nature of the vein.

Example 3

The present method will give a similar result of the above Example 2 without the polishing phase with the final coat of acrylic resin.

Preparation
1. Create a case with a lid to contain the shape and measure of the mold.
2. Put the mold in the case and live the lid opened.
3. Spread a release-agent on the surface of the mold
4. Spread in the mold a clear coat of epoxy.
5. Prepare three or more mixtures in ratio of 1 to 6 of clear epoxy and marble dust of three or more different color, like Pink corallo marble, white Carrara, gray occhialino dust (size 0.7-1.2 mm).
6. Prepare a liquid mixture of clear epoxy and pigments color
7. Create clusters of different color and sizes with the mixtures
8. Create a bigger mass on a table a side, laying the clusters one on each other, in a no-uniform way, interposing the liquid mixture in the gap between them.
9. Cut in slice the mass
10. Every slice will show veins marble like or granite like (it will depend on the size of the clusters) that will be positioned into the depressions in the mold, in a no-uniform way
11. Clean in different ways (scraping, use mask) the ribs of the mold.
12. Prepare a mix in ratio 1 to 4 in weight of clear epoxy with a mix in ratio 1 to 1 in weight of grout (grey occhialino marble dust (size 0.7-1.2 mm)) with micro balloon of glass (size between 0.3-3 mm) or silica fume and lay it on the mold filling it completely and cover it with the sheet of polystyrene and close firmly the lid of the case on it until it cures.

Example 3 will replicate granite (if the diameter of the clusters are in range of 1mm to 20 mm) and marble (if the diameter of the clusters are bigger without limit).

In option polishing phase with a final coat of acrylic resin will lighten up the nature of the vein.

Through the embodiments that are illustrated and described, the currently contemplated best mode of making and using the invention is described. Without further elaboration, it is believed that one of ordinary skill in the art can, based on the description presented herein, utilize the present invention to the full extent. All publications cited herein are incorporated by reference.

Although the description above contains many specificities, these should not be construed as limiting the scope of the invention, but as merely providing illustrations of some of the presently embodiments of this invention.

What is claimed is:

1. A panel for covering a substrate, the panel comprising:
a body comprising a front face which provides a viewable surface, and a back face opposite to the front face, a first lateral side having a first connecting profile and a second lateral side opposite to the first lateral side, the second lateral side having a second connecting profile, and a mesh connected to the back face,
the first connecting profile and the second connecting profile being complementarily shaped in such a way that the panel can couple to adjacent panels via the first connecting profile and the second connecting profile,
each of the first connecting profile and the second connecting profile of the panel comprising a pocket and a flange, the pocket of the first connecting profile being shaped for receiving the flange of the second connecting profile and the pocket of the second connecting profile being shaped for receiving the flange of the first connecting profile,
wherein the mesh overhangs both the pocket of the first connecting profile on the first lateral side of the panel and the pocket of the second connecting profile on the second lateral side of the panel,
wherein said mesh overhangs are viewed from the front face of the panel through the pocket of the first connecting profile and through the pocket of the second connecting profile, and
wherein the mesh overhangs are configured for attachment of the panel to the substrate.

2. The panel of claim 1, wherein the panel further comprises a base layer connected to the bottom face of the body for attachment of the panel to the substrate, wherein the mesh and the base layer overhang both the pocket of the first connecting profile and the pocket of the second connecting profile.

3. The panel of claim 2, wherein the base layer includes a first face connected to the bottom face of the body, a second face for connecting to the substrate and lateral walls extending from the first face to the second face,
the second face of the base layer having one or more ventilation channels extending from one lateral edge to another lateral edge, and the lateral walls of the base layer having a dovetail shape designed for receiving a connector element.

4. The panel of claim 1, wherein the viewable surface of the top face includes grooves that simulate grout.

5. The panel of claim 1, wherein the viewable surface includes artificial depressions and textures that replicate depressions and textures of a natural stone.

6. The panel of claim 1, wherein the body comprises a multifilm layer of overlapping films: an external transparent film, a film of granules and a support film that provides mechanical support to the panel and forms the bottom face of the body, wherein the external transparent film comprises a transparent polymer, the film of granules comprises dust filler, a cross-linking agent, a cross-linking accelerator and a color pigment, and the support film comprises binders, fillers and dyes, and wherein the mesh is immersed in the support film.

7. The panel of claim 1, wherein the substrate is a wall, a floor or a roof.

8. A panel for covering a substrate, the panel comprising:
a body comprising a top face which provides a viewable surface, and a bottom face opposite to the top face, a first connecting profile and a second connecting profile, a base layer and a mesh,
the first connecting profile and the second connecting profile being complementarily shaped in such a way that adjacent panels are coupled to one another via the first connecting profile and the second connecting profile,
each of the first connecting profile and the second connecting profile comprising a pocket and a flange, the pocket of the first connecting profile being shaped for receiving the flange of the second connecting profile and the pocket of the second connecting profile being shaped for receiving the flange of the first connecting profile, wherein the base layer includes a first face connected to the bottom face of the body, a second face for connecting to the substrate and lateral walls extending from the first face to the second face, the second face of the base layer having one or more ventilation channels extending from one lateral edge to another lateral edge, and the lateral walls of the base layer having a dovetail shape designed for receiving a connector element, and wherein the base layer and the mesh overhang both the pocket of the first connecting profile and the pocket of the second connecting profile, said mesh overhangs configured for attachment of the panel to the substrate.

9. The panel of claim 8, wherein the viewable surface of the top face includes groves that simulate grout.

10. The panel of claim 8, wherein the viewable surface includes artificial depressions and textures that replicate depressions and textures of a natural stone.

11. The panel of claim 8, wherein the body comprises a multifilm layer of overlapping films: an external transparent film, a film of granules and a support film that provides mechanical support to the panel and forms the bottom face of the body, wherein the external transparent film comprises a transparent polymer, the film of granules comprises dust filler, a cross-linking agent, a cross-linking accelerator and a color pigment, and the support film comprises binders, fillers and dyes, and wherein the mesh is immersed in the support film.

12. The panel of claim 8, wherein the substrate is a wall, a floor or a roof.

13. A panel for covering a substrate, the panel comprising:
a body comprising a top face which provides a viewable surface, and a bottom face opposite to the top face, a first connecting profile and a second connecting profile, and a mesh, the body comprising a multifilm layer of overlapping films: an external transparent film, a film of granules and a support film that provides mechanical support to the panel and forms the bottom face of the body, wherein the external transparent film comprises a transparent polymer, the film of granules comprises dust filler, a cross-linking agent, a cross-linking accelerator and a color pigment, and the support film comprises binders, fillers and dyes, and wherein the mesh is immersed in the support film, the first connecting profile and the second connecting profile being complementarily shaped in such a way that adjacent panels are coupled to one another via the first connecting profile and the second connecting profile, each of the first connecting profile and the second connecting profile comprising a pocket and a flange, the pocket of the first connecting profile being shaped for receiving the flange of the second connecting profile and the pocket of the second connecting profile being shaped for receiving the flange of the first connecting profile, wherein the mesh overhangs both the pocket of the first connecting profile and the pocket of the second connecting profile, said mesh overhangs configured for attachment of the panel to the substrate.

14. The panel of claim 13, wherein the panel further comprises a base layer connected to the bottom face of the body for attachment of the panel to the substrate, wherein the mesh and the base layer overhang both the pocket of the first connecting profile and the pocket of the second connecting profile.

15. The panel of claim 13, wherein the base layer includes a first face connected to the bottom face of the body, a second face for connecting to the substrate and lateral walls extending from the first face to the second face,
the second face of the base layer having one or more ventilation channels extending from one lateral edge to another lateral edge, and the lateral walls of the base layer having a dovetail shape designed for receiving a connector element.

16. The panel of claim 13, wherein the viewable surface of the top face includes groves that simulate grout.

17. The panel of claim 13, wherein the viewable surface includes artificial depressions and textures that replicate depressions and textures of a natural stone.

* * * * *